Feb. 2, 1954 A. E. W. JOHNSON ET AL 2,667,724
WHEEL SUPPORT FOR TANDEM DISK HARROWS
Filed Dec. 4, 1948 2 Sheets-Sheet 1

Inventors:
Arnold E. W. Johnson
John R. Orelind

Paul O. Pippel
Atty.

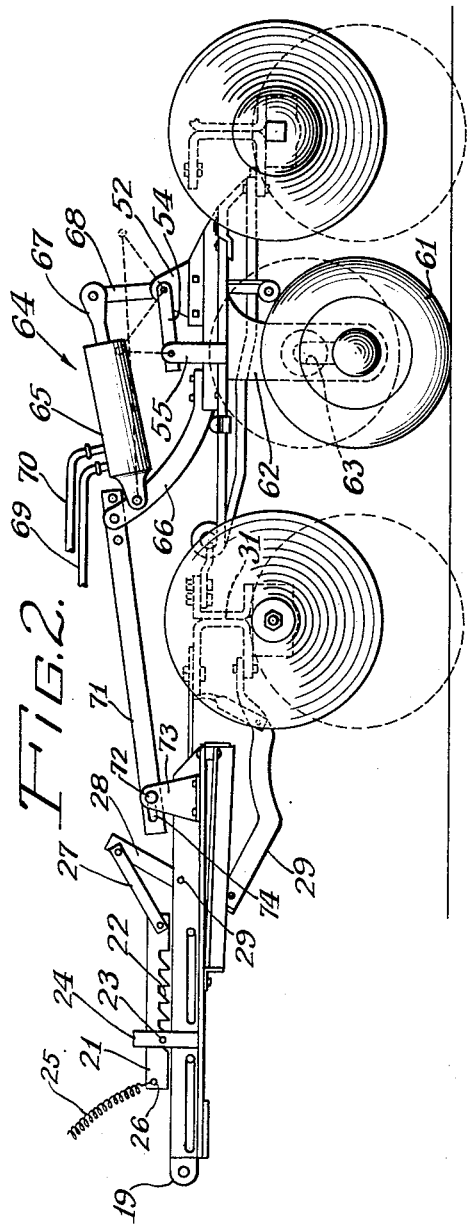
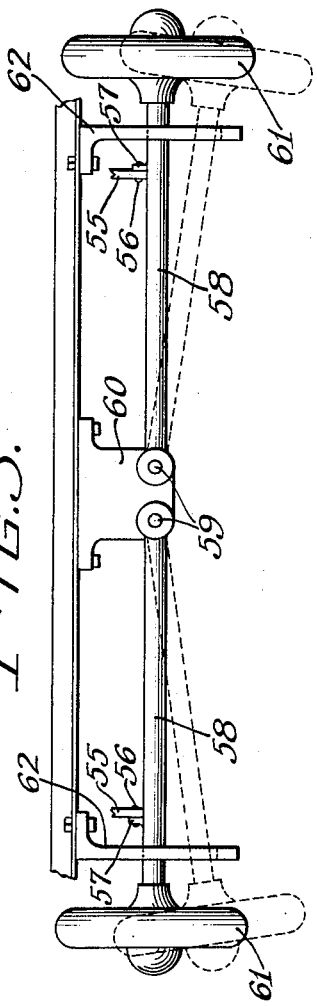

Patented Feb. 2, 1954

2,667,724

UNITED STATES PATENT OFFICE 2,667,724

WHEEL SUPPORT FOR TANDEM DISK HARROWS

Arnold E. W. Johnson, Oak Park, and John R. Orelind, Wilmette, Ill., assignors to International Harvester Company, a corporation of New Jersey Application December 4, 1948, Serial No. 63,562

3 Claims. (Cl. 55—73)

This invention relates to harrows and particularly to tandem disk harrows having relatively movable gangs. More specifically the invention concerns a wheel support for movable gang harrows.

A tandem disk harrow comprises a pair of laterally alined gangs of earth working disks mounted on a framework and capable of being relatively angled about a vertical axis in working position. A second pair of gangs to the rear of the first pair is capable of being angled in the opposite direction for the purpose of throwing dirt in a different direction from the front gangs. Means are provided usually associated with the implement hitch and controlled by the draft on the implement for angling and deangling the gangs. For purposes of transporting the harrow the angle is taken out of the gangs and they are alined so that the disks will travel in a vertical longitudinal extending plane, facilitating their passage over the ground and minimizing the possibility of damage thereto. This method of transportation, however, is unsatisfactory since the disks are easily damaged and scratch the ground over which they travel. Likewise, the frictional contact of the disks with the ground and the character of the implement render it difficult to transport and steer when propelled by a tractor or the like.

Wheel supports for disk harrows are already known. The harrows are, however, usually provided with crank axles upon which the wheels are mounted. To move the harrow between transport and operating positions involves swinging of the crank axle, which causes the wheels to travel longitudinally through an arc in moving the harrow frame up and down. In a harrow, particularly a change-angle tandem disk harrow, space between the disk gangs is at a premium and a wheel support of the type referred to could not be utilized.

An object of the invention is to provide in a disk harrow means to facilitate transportation thereof.

Another object of the invention is to provide a wheel support for a tandem disk harrow wherein the space required for the operation of the wheels is at a minimum.

Another object of the invention is to provide a novel mounting for the wheels of a wheel-supported tandem disk harrow wherein the wheel axles are pivoted at one end and the wheels move in a transverse vertical plane.

Another object of the invention is to provide a wheeled support for a change-angle tandem disk harrow to facilitate handling thereof and to raise the disks out of contact with the ground for transport purposes.

A further object of the invention is to provide an improved tandem disk harrow having means for changing the angle of the disk gangs and means for transporting the harrow without the necessity of deangling the gangs.

Other objects and advantages of the invention will become clear from the following detailed description when read in conjunction with the accompanying drawings, wherein:

Fig. 2 is a side elevation partly in section of the harrow construction shown in Fig. 1; and Fig. 3 is a rear elevation with parts removed for clarity showing the manner of mounting the supporting wheels for the harrow.

Figure 1:
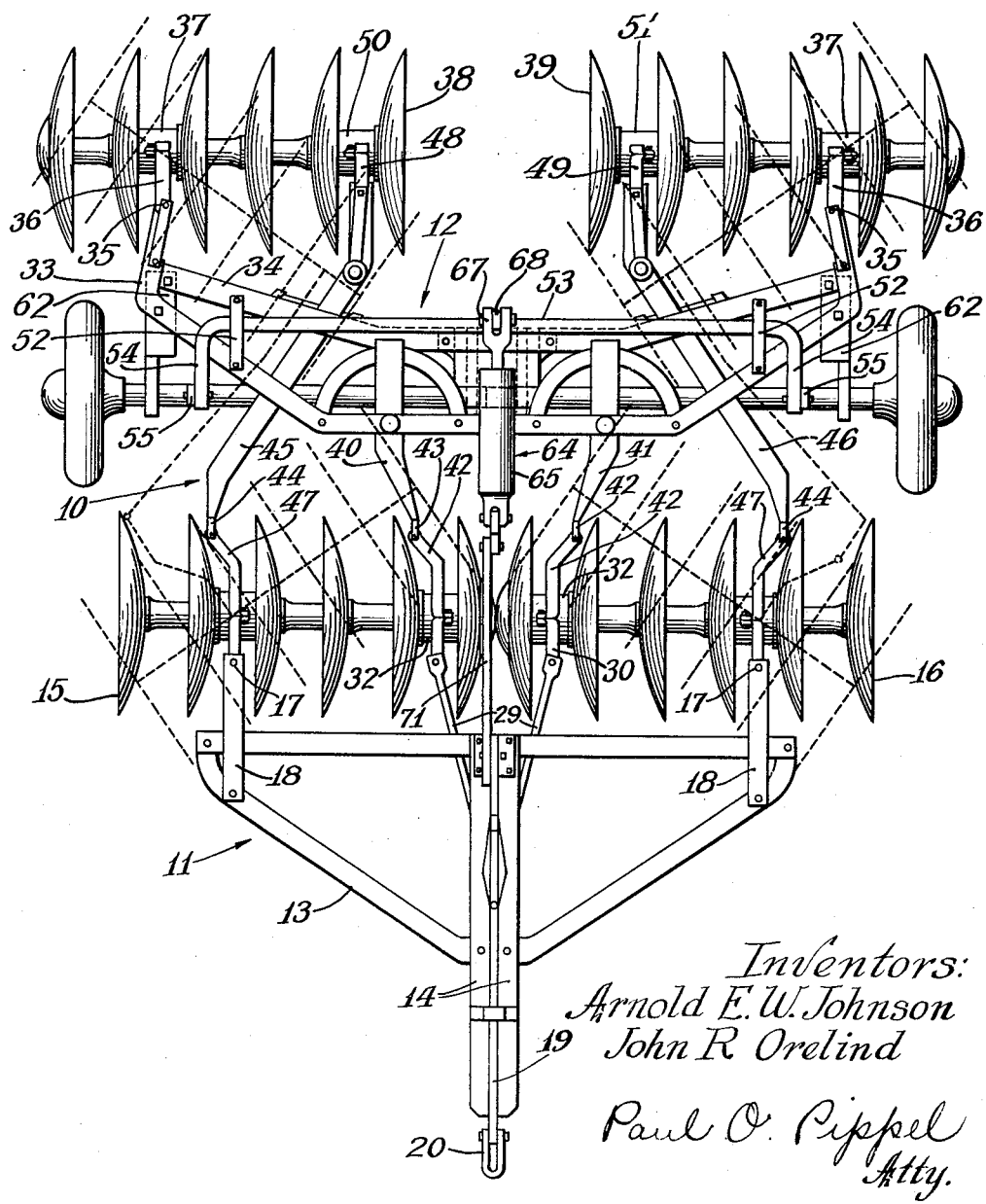
Fig. 1 is a plan view of a change-angle tandem disk harrow embodying the features of the present invention.

The agricultural implement shown in the drawings is a tandem disk harrow wherein longitudinally spaced pairs of disk gangs are adapted to be angled with respect to each other to positions indicated by the dotted lines in Fig. 1. This harrow comprises a frame designated by the numeral 10 and comprising a front frame section 11 and a rear frame section 12. Front section 11 includes a transversely extending triangular member 13 and a longitudinally extending draft tongue which comprises laterally spaced parallel bars 14.

A forward pair of transversely alined disk gangs 15 and 16 are pivotally connected at 17 to the rear ends of draft members 18 secured to the outer ends of the triangular hitch frame 13. By being thus pivoted the gangs 15 and 16 are capable of swinging about the pivot 17 to positions indicated by the dotted lines in Fig. 1.

The angular adjustment of the gangs 15 and 16 is accomplished by mechanism which includes a draft head 19 mounted between the parallel members 14 for longitudinal slidable movement relative thereto in a manner well known in the implement industry. The forward end of the draft head 19 is provided with a clevis 20 by which the implement may be connected to the draw bar of a tractor for propelling the implement across a field. The rear end of draft head 19 is curved upwardly and has pivotally secured to the end thereof the rear end of a latch tongue 21 provided with notches 22 cooperable with a latch pin 23 carried by a yoke 24 which serves to guide the latch tongue 21. A rope 25 secured at an aperture 26 in the latch tongue extends forwardly to the tractor and may be operated therefrom to lock or release for sliding movement the draft head 19. In the position indicated in Fig. 2, the draft head 19 is locked in position by engagement of latch pin 23 in one of the notches 22 of the latch tongue 21. By pulling upon the rope 25 the operator of the tractor by which the implement is propelled can withdraw the latch from engagement with the pin 23 and allow the draft head to slide relative to the draft members 14.

The rear end of the draft head 19 and the pivotal connection of latch tongue 21 thereto also provide a pivotal connection for the forward end of a link 27, the rear end of which is pivotally connected to the upper end of a lever 28 which in turn is pivoted intermediate its ends at 29 upon the draft bars 14. The lower end of the lever 28 is pivotally connected to a pair of links 29. The rear ends of links 29 are pivotally connected to forwardly extending arms 30 forming a part of an upright 31 secured to bearing boxes 32 at the inner end of each of the front gangs 15 and 16.

It should now be clear that upon release of the latch 21 and a forward pull upon draft head 19 with respect to the draft members 14, lever 28 will be rocked in a counter-clockwise direction as viewed in Fig. 2 to force links 29 rearwardly and urge rearwardly the inner ends of the gangs 15 and 16 so that the gangs of disks will occupy the positions indicated in dotted lines in Fig. 1.

The rear frame section 12 of the disk harrow comprises a forwardly arched transversely extending frame bar 33 braced by a transverse bar 34. Frame bar 33 at each end thereof is pivotally connected at 35 to a forwardly extending arm 36 secured to a bearing box 37 upon laterally spaced disk gangs 38 and 39. Rear gangs 38 and 39, as shown in Fig. 1, may be angled in a horizontal direction about pivots 35 to the positions indicated in dotted lines.

Draft is transmitted from the draft tongue 14 and the front frame section 13 to the rear frame section 12 and its associated disk gangs 38 and 39 by a pair of laterally spaced links 40 and 41. Link 40 extends forwardly from and is secured to the rear frame section 12, and is connected to an arm 42 extending rearwardly from the upright 31 through the intermediary of a link 43, the latter connection providing relative vertical pivotal movement of the gang sections 11 and 12 about transverse pivots represented by the connections of links 40 and 41 to the arms 42. In substantially transverse alinement with the links 43 are links 44 which connect laterally spaced bars 45 and 46 to arms 47 extending rearwardly from uprights 31.

It should now be clear that upon forward movement of draft head 19 relative to the draft tongue the inner ends of the front gangs 15 and 16 will move rearwardly causing the arms 47 to swing outwardly and forwardly and through bars 45 and 46 to urge forwardly the inner ends of the gangs 38 and 39, this by virtue of the pivotal connection of the rear ends of arms 45 and 46 to arms 48 and 49 extending forwardly from bearing boxes 50 and 51 carried at the inner ends of the rear gangs.

As will be observed from a study of Fig. 1, the disk gangs, when they are angled to the dotted line position indicated, approach each other very closely. Likewise, in the solid line position shown, the space between the front and rear sets of gangs is at a premium. It is customary with implements of this type to not attempt to provide wheeled supports therefor inasmuch as such wheeled supports will either interfere with the angling of the gangs and limit the amount of angling thereof or will themselves require so much space for their operation that they become impractical. It is therefore customary to transport the disk gangs without wheeled supports upon the disks themselves in the position indicated in solid lines in Fig. 1. The working position of the disk gangs is the dotted line position where the disks aggressively engage the ground and the gangs throw dirt in opposite directions. Likewise an implement of this type is difficult to handle in transport position due to the articulated character of the front and rear frame sections, being connected together on a transversely extending pivot for relative pivoting movement.

The present invention was designed to provide a wheeled support for a tandem disk harrow of the change-angle type which would require a minimum of space for operation thereof and would not interfere with the operation of the disk gangs.

Secured to the rear frame bars 33 and 34 of the rear section 12 and extending upwardly therefrom are a pair of laterally spaced lugs 52 provided with suitable bearings to support a rock shaft 53, the ends of which projecting beyond the lugs 52 are bent generally forwardly to provide lift arms 54 pivotally connected at their ends to lift links 55, the lower ends of which are pivoted upon pins 56 carried by lugs 57 secured to the outer ends of a pair of axially alined transversely extending axles 58. The inner end of each of the axles 58 is pivotally mounted at 59 in a bearing block 60 affixed to and depending from the rear frame section 12. Due to the pivotal mounting of axles 58 at 59 they are vertically movable about these pivots from the solid line position to the dotted line position indicated in Fig. 3. Each of the axles 58 has journaled upon its end a ground wheel 61.

In order to confine the action of the axles 58 and provide for vertical movement thereof in a transverse plane, a pair of guide brackets 62 are provided, one being secured and depending from the rear frame section at opposite ends thereof. As clearly shown in Fig. 2, this bracket 62 is provided with a vertically extending slot 63 adapted to receive the outer end of the axle 58 and to confine the axle against longitudinal movement relative to the implement while accommodating vertical movement thereof in a substantially straight line.

Raising and lowering of the axles 58 and wheels 61 to move the implement from the solid line or raised position indicated in Fig. 2 to the dotted line or operating position thereof is accomplished by lifting mechanism which includes a ram unit 64 which comprises a cylinder 65 pivotally mounted upon a bracket 66 affixed to the rear frame section and curving forwardly and upwardly. The piston rod 67 of the ram unit is pivotally connected to the upper end of a rock arm 68 mounted upon the transverse rock shaft 53 centrally thereof. Fluid under pressure is supplied to the cylinder 65 through hose lines 69 and 70 from a source of fluid pressure preferably deriving power from the tractor, not shown, by which the implement is drawn. Extension of the piston rod 67 from the position shown in Fig. 2 will rock the arm 68 and the rock shaft 53 in a clockwise direction, raising the lift link 55 and lowering the disk gangs to operating position.

In the transport position of the implement shown in Fig. 2, the draft head 19 is connected to a tractor draw bar, not shown, and the two frame sections 11 and 12 of the implement are capable of tilting about the transverse pivots represented by the links 43 and 44. In order to overcome the tendency of the implement to buckle about this transverse pivot, a brace rod 71 is provided, the rear end of which is adjustably and pivotally connected to the upper end of the bracket 66 and the forward end of which is pivotally connected by a pin 72 to the upper end of a lug 73 secured to the draft members 14. The member 71 thus functions as a brace to prevent relative pivoting of the frame sections. However, since a certain amount of relative pivoting of the frame sections is desirable in transporting the implement, a slot 74 is provided for the reception of the pin 72 in brace bar 71. This provides a certain amount of lost motion which accommodates limited relative movement of the frame sections while preventing buckling thereof.

It is believed that the operation of the novel tandem disk harrow construction of the present invention will be clearly understood from the foregoing description. It may likewise be understood that modifications may be made in the invention without departing from the spirit thereof or the scope of the appended claims.

What is claimed is:

1. For use with a tandem disk harrow including longitudinally spaced disk gangs, an articulated frame supporting said gangs comprising front and rear sections pivotally connected for relative movement of the gangs about a transverse axis therebetween and a hitch structure for connecting the harrow to a source of draft power: a pair of transversely alined axles between said sections having their inner ends pivotally connected to the frame for vertical movement of the outer ends about longitudinal axes, wheels carried at the outer ends of the axles, a vertically slotted bracket carried by the frame at each side thereof, the slot in each said bracket being adapted to receive and confine the associated axle against longitudinal movement but to accommodate vertical movement thereof, means for vertically moving said axles about their central pivots to raise and lower the harrow, and a lost-motion connection between said front and rear frame sections vertically spaced from the transverse pivot therebetween to prevent buckling of the frame, while permitting limited pivoting of the frame sections.

2. For use with a tandem disk harrow including an articulated frame comprising front and rear sections pivotally connected for relative movement of the sections about a transverse axis therebetween, a hitch frame, and longitudinally spaced disk gangs carried by the respective front and rear frame sections for relative horizontal movement about vertical axes: a pair of transversely alined axles between said sections having their inner ends pivotally connected to the frame for vertical movement of the outer ends about longtudinal axes, wheels mounted on the outer ends of the axles for supporting the frame, means associated with said hitch frame and connected to said gangs for effecting relative horizontal pivoting thereof, means carried by the frame adapted to guide the axles in a vertical path, and a lost motion connection extending between said front and rear frame sections above the transverse pivot therebetween to provide for limited relative pivoting of the frame sections.

3. For use with a tandem disk harrow including an articulated frame comprising front and rear sections pivotally connected for relative movement of the sections about a transverse axis therebetween, a hitch frame, and longitudinally spaced disk gangs carried by the respective front and rear frame sections for relative horizontal movement about vertical axes; a pair of transversely alined axles between said sections having their inner ends pivotally connected to the frame for vertical movement of the outer ends about longitudinal axes, wheels mounted on the outer ends of the axles for supporting the frame, means associated with said hitch frame and connected to said gangs for effecting relative horizontal pivoting thereof, guide means for said axles comprising a pair of brackets carried by the frame at laterally opposite sides thereof, a vertical slot formed in each said bracket to receive the associated axle, lift means mounted on the frame, a connection between the lift means and the outer end of each said axle for raising and lowering the wheels relative to the frame, and a connection having lost motion extending between said front and rear frame sections above the transverse pivot therebetween to limit relative pivoting thereof.

ARNOLD E. W. JOHNSON.
JOHN R. ORELIND.

References Cited in the file of this patent

UNITED STATES PATENTS

| Number | Name | Date |
|---|---|---|
| 26,704 | Peck | Jan. 3, 1860 |
| 919,854 | Gross et al. | Apr. 27, 1909 |
| 1,362,795 | Holsey | Dec. 21, 1920 |
| 1,725,409 | Mowry et al. | Aug. 20, 1929 |
| 2,144,961 | Book | Jan. 24, 1939 |
| 2,164,550 | Steward | July 4, 1939 |
| 2,228,508 | Crumb et al. | Jan. 14, 1941 |
| 2,336,410 | McKay | Dec. 7, 1943 |
| 2,349,257 | Evans et al. | May 23, 1944 |
| 2,356,876 | Newkirk | Aug. 29, 1944 |

FOREIGN PATENTS

| Number | Country | Date |
|---|---|---|
| 296,567 | Germany | Feb. 17, 1917 |